(12) United States Patent
Organiscak et al.

(10) Patent No.: US 7,727,765 B2
(45) Date of Patent: Jun. 1, 2010

(54) METHOD FOR LEAK TESTING AN ENVIRONMENTAL ENCLOSURE

(75) Inventors: John A. Organiscak, Eighty Four, PA (US); Michael Schmitz, Defiance, IA (US)

(73) Assignee: The United States of America as represented by the Secretary of the Department of Health and Human Services, Centers for Disease Control and Prevention, Washington, DC (US)

( * ) Notice: Subject to any disclaimer, the term of this patent is extended or adjusted under 35 U.S.C. 154(b) by 1414 days.

(21) Appl. No.: 10/532,483

(22) PCT Filed: Oct. 22, 2003

(86) PCT No.: PCT/US03/33506

§ 371 (c)(1),
(2), (4) Date: Apr. 22, 2005

(87) PCT Pub. No.: WO2004/038358

PCT Pub. Date: May 6, 2004

(65) Prior Publication Data

US 2006/0154371 A1    Jul. 13, 2006

Related U.S. Application Data

(60) Provisional application No. 60/421,593, filed on Oct. 24, 2002.

(51) Int. Cl.
*G01N 31/00* (2006.01)

(52) U.S. Cl. .................. 436/3; 436/56; 73/40

(58) Field of Classification Search ............ 73/40, 73/40.7, 49.2; 436/3, 56
See application file for complete search history.

(56) References Cited

U.S. PATENT DOCUMENTS 2,996,661 A    8/1961    Roberts (Continued)

FOREIGN PATENT DOCUMENTS

EP    0640822    3/1995

(Continued)

OTHER PUBLICATIONS

Heitbrink et al., "Review of Ambient Aerosol Test Procedures in ASAE Standard 5525," *Journal of Agricultural Safety and Health*, 4(4):255-266 (1998).

(Continued)

*Primary Examiner*—Lyle A Alexander
(74) *Attorney, Agent, or Firm*—Klarquist Sparkman, LLP (57) ABSTRACT

Methods and apparatus are disclosed for leak testing the ventilation system of an environmental enclosure using a gas that is naturally present in ambient air, such as nitrogen, oxygen, argon, or carbon dioxide, as a tracer gas. In one embodiment, a gas filter capable of filtering all of the tracer gas from the air flowing through the filter is installed in the ventilation system. Testing is performed by operating the ventilation system to cause outside air to flow through the filter and into the enclosure so as to establish positive pressurization inside the enclosure. A gas monitor placed inside the enclosure is used to detect for the presence of leaks in the ventilation system by monitoring the concentration of the tracer gas inside the enclosure.

15 Claims, 3 Drawing Sheets

U.S. PATENT DOCUMENTS

| | | | |
|---|---|---|---|
| 3,302,449 A | | 2/1967 | Roberts |
| 4,459,844 A | | 7/1984 | Burkhart |
| 4,492,151 A | | 1/1985 | Mattei |
| 4,515,007 A | | 5/1985 | Herman |
| 4,879,999 A | * | 11/1989 | Leiman et al. .......... 128/207.14 |
| 5,127,264 A | | 7/1992 | Schmalz |
| 5,423,903 A | | 6/1995 | Schmitz et al. |
| 5,992,217 A | | 11/1999 | Jax et al. |
| 6,125,710 A | | 10/2000 | Sharp |
| 6,157,897 A | | 12/2000 | Yoshikawa |
| 6,189,369 B1 | | 2/2001 | Yokogi |
| 6,207,460 B1 | | 3/2001 | Kishkovich et al. |
| 6,241,950 B1 | * | 6/2001 | Veelenturf et al. .......... 422/103 |
| 6,314,794 B1 | | 11/2001 | Seigeot |
| 2002/0036760 A1 | | 3/2002 | Udagawa et al. |
| 2003/0035087 A1 | | 2/2003 | Murayama |

FOREIGN PATENT DOCUMENTS

| | | | |
|---|---|---|---|
| WO | 02/063294 | * | 8/2002 |
| WO | WO02063294 | | 8/2002 |

OTHER PUBLICATIONS

Organiscak et al., "Field Assessment of Retrofitting Surface Coal Mine Equipment Cabs with Air Filtration Systems," Presented at the 31$^{st}$ Annual Institute on Mining Health, Safety and Research Conference, Roanoke, Virginia, Aug. 27-30, 2000 (published in conference proceedings, pp. 57-68).

Kyriaz, Nicholas, "Effects of $Co_2$-Absorbent Canister Design on LiOH Efficiency in Closed-Circuit Breathing Appartus," Bureau of Mines Report of Investigations, 8513, United States Department of the Interior (1981).

Bernard, T.E. et al., "$Co_2$-Absorption Characteristics of Mine Rescue Breathing Apparatus," Bureau of Mines Report of Invetigations, 8342, United States Department of Interior (1979).

TSI Incorp. Website, "TSI Dusttrak Aerosol Monitor Model 8520—air quality monitor," www.tsi.com/products/dustrak.aspx (2 pages).

Airtect Limited website, "Leak Monitors," www.airtect.com/leakmonitors.html (2 pages).

GRIMM Technologies, Inc. website, "Ultrafine Particle Counters," www.dustmonitor.com/Research/Counters.htm (4 pages).

Inficon website, "Inficon refrigerant and helium leak detectors for quality control at refrigeration, air conditioning . . . ," www.inficonindustrialleakdetectors.com/index.html (2 pages).

* cited by examiner

METHOD FOR LEAK TESTING AN ENVIRONMENTAL ENCLOSURE

CROSS-REFERENCE TO RELATED APPLICATIONS

The present application is the National Stage of International Application No. PCT/US03/33506, filed Oct. 22, 2003, which claims the benefit of U.S. provisional application No. 60/421,593, filed Oct. 24, 2002.

FIELD

The present disclosure concerns a method and apparatus for leak testing an environmental enclosure used in a polluted atmosphere, such as an operator cab of a vehicle.

BACKGROUND

Vehicles used in polluted atmospheres, such as those used in mining or agricultural work, are equipped with air filtration equipment for protecting the operators of such equipment from airborne contaminants. Such vehicles typically have an enclosed operator cab and a ventilation system having an air inflow conduit for feeding a motor-driven fan or blower. The fan induces air to flow through a dust filter and in some installations, an activated-charcoal filter for adsorbing harmful vapors/gases, after which the filtered air is conveyed into the operator cab.

Enclosed operator cabs can provide very high levels of protection from airborne contaminants so long as clean, filtered air is introduced into the cab with positive air pressurization of the cab interior. However, leaks in the ventilation system can allow airborne contaminants to enter the operator cab. Typically, the areas within a ventilation system that have a tendency to cause leaks include the sealing area around the filter, the joints between separate portions of ductwork, and the openings in the ductwork provided for the electrical wiring of the fans. If major leaks occur, the effectiveness of the cab filtration system can be severely diminished, thereby compromising the safety of the operator. Thus, the ventilation system should be periodically leak tested to ensure the cab enclosure provides sufficient protection for the operator.

One method for leak testing the ventilation system of a cab enclosure is specified in ASAE (American Society of Agricultural Engineers) Standard S525. In this method, the vehicle being tested is driven over a non-paved surface to increase the levels of aerosol and dust in the atmosphere surrounding the vehicle. As the vehicle is driven, one optical particle counter is used to measure ambient aerosol and dust concentrations outside the operator cab of the vehicle and another optical particle counter is used to measure aerosol and dust concentrations inside the operator cab. For a cab to be considered acceptable, the ratio of the concentrations outside the cab to the concentrations inside the cab must be greater than 50. Heitbrink et al., "Review of Ambient Aerosol Test Procedures in ASAE Standard S525," *Journal of Agricultural Safety and Health,* 4(4): 255-266 (1998).

The foregoing method suffers from the drawback that the concentration of ambient aerosols varies with location and time of year. Thus, the test can be impractical in certain locations or during certain times of the year when the ambient aerosol concentration is not large enough to overcome any extraneous aerosol generation in the cab. Id.

In another method for leak testing the ventilation system of an operator cab, the cab is placed inside a laboratory test chamber and exposed to an atmosphere containing a constant level of ethyl acetate. During the test, the ventilation system of the cab is operated to cause the surrounding atmosphere to flow through a filter capable of filtering ethyl acetate and into the interior of the cab. A gas monitor placed inside the cab is used to detect for the presence of leaks in the ventilation system by monitoring the concentration of ethyl acetate inside the cab. Although more reliable than the method for testing cabs in the field set forth by ASAE Standard S525, laboratory testing is much more inconvenient than such field-testing since the cab to be tested must be driven or otherwise transported to a testing facility.

Accordingly, there exists a need for new and improved systems for leak testing ventilation systems of enclosed operator cabs.

SUMMARY

According to one aspect, methods are provided for leak testing the ventilation system of an environmental enclosure using a gas that is naturally present in ambient air (e.g., nitrogen, oxygen, argon, or carbon dioxide) as a tracer gas. An embodiment of such a method includes inducing outside air to flow through a filter in the ventilation system and into the enclosure so as to establish positive pressurization inside the enclosure. The filter includes filter media selected to filter tracer gas from the air stream flowing through the filter to cause a decrease in the concentration of tracer gas inside the enclosure. During the test, the concentration of tracer gas inside the enclosure is monitored to determine the lowest achievable concentration of tracer inside the enclosure.

To determine whether there are any leaks in the ventilation system, the lowest achievable concentration of tracer gas inside the enclosure is compared to the expected concentration of tracer gas inside the enclosure due to losses through the filter. The presence of leaks in the ventilation system is revealed if the lowest achievable concentration of tracer gas is greater than the expected concentration of tracer gas inside the enclosure due to losses through the filter.

Desirably, the filter is designed to be 100% efficient; that is, the filter is capable of removing all of the tracer gas from the air flowing through the filter. Using such a filter, the presence of leaks is revealed if the lowest achievable concentration of tracer gas is greater than zero.

In a disclosed embodiment, carbon dioxide that is naturally present in the ambient air is used as the tracer gas for leak testing an enclosure. Hence, in this embodiment, the filter media is selected to filter carbon dioxide from the air stream flowing through the filter. In particular embodiments, for example, soda lime is used as the filter media for absorbing carbon dioxide from the air flowing through the filter. However, various other types of filter media, such as sodium hydroxide, calcium hydroxide or lithium hydroxide, also may be used.

The use of a naturally-occurring component of air as a tracer gas for leak testing an enclosure, such as described above, provides several advantages. In particular, vehicles can be easily tested in the field, without the need for an expensive or elaborate test chamber, since the tracer gas is naturally present in the atmosphere surrounding the vehicle to be tested. Moreover, such field-testing requires only the use of a single monitoring device, which is used for measuring the concentration of the tracer gas inside the enclosure being tested. In contrast, the test procedure specified by ASAE Standard S525 requires a particle counter for monitoring particle concentrations outside the enclosure being tested and another particle counter for monitoring particle concentrations inside the enclosure. Further, using a component of air as the tracer gas eliminates the constraints associated with using ambient aerosols and dust for testing an enclosure, such as specified by ASAE Standard S525.

The foregoing and other features and advantages of the invention will become more apparent from the following detailed description of several embodiments, which proceeds with reference to the accompanying figures.

DETAILED DESCRIPTION

Figure 1:
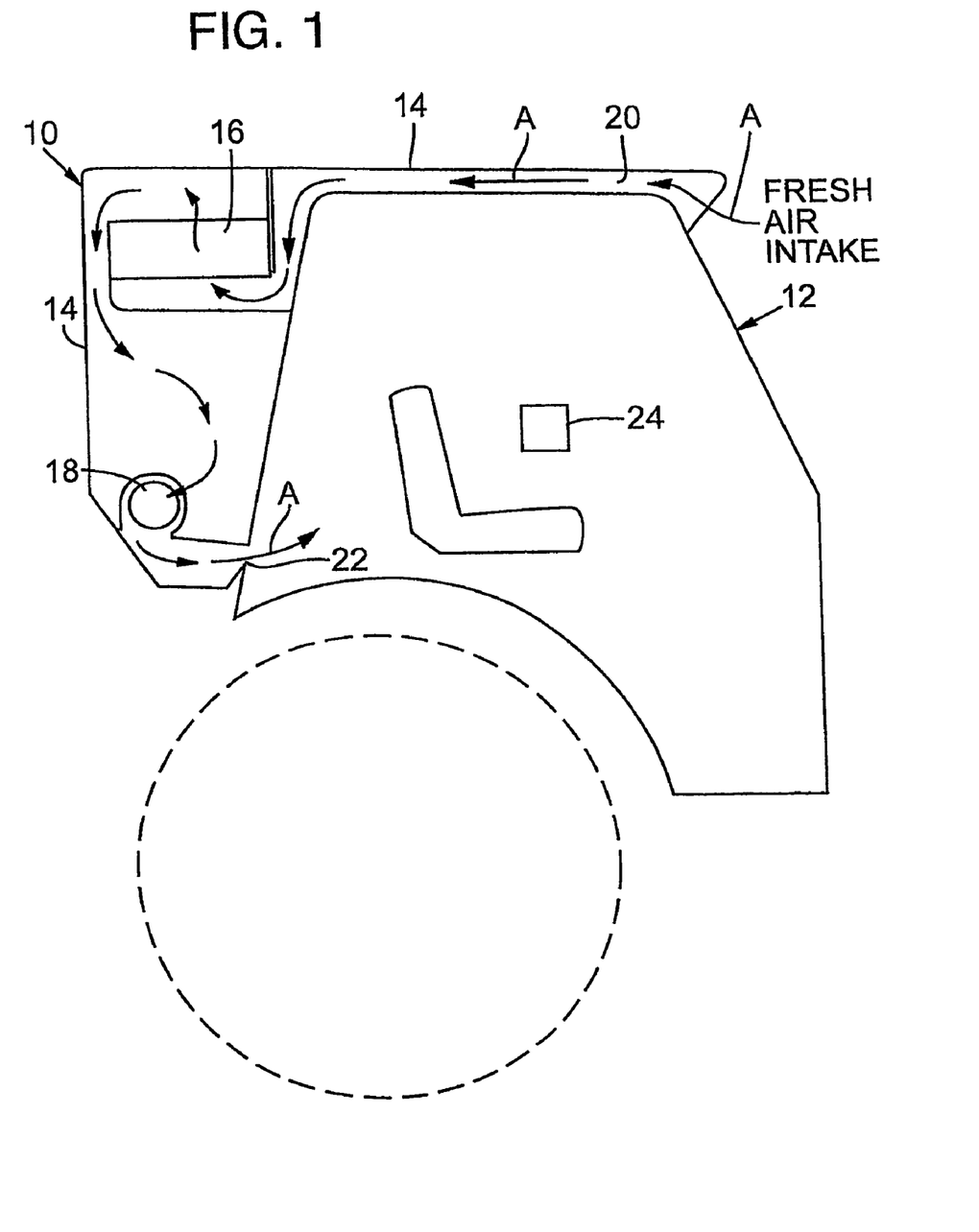
FIG. 1 is a schematic side view of an enclosed operator cab of a vehicle.

FIG. 1 illustrates a method, according to one embodiment, for leak testing the ventilation system 10 of an environmental enclosure, such as the illustrated enclosed vehicle operator cab 12, using a gas that is naturally present in ambient air (e.g., nitrogen, oxygen, argon, or carbon dioxide) as a tracer gas. For the purpose of testing the ventilation system 10, the existing filter of the vehicle is temporarily removed and replaced with a test filter, indicated at 16, capable of filtering the tracer gas from the air flowing through the filter 16. The test filter 16 desirably is 100% efficient; that is, the filter 16 is capable of removing all of the tracer gas from the air flowing through the filter.

The ventilation system 10 includes ductwork 14 defining an inlet conduit 20 and one or more airflow inducers 18 (e.g., fans or blowers). The inducers 18 are operable to induce outside air to flow through the inlet conduit 20 and the filter 16, and into the cab 12 through an opening 22, as indicated by arrows A.

The operator cab 12 can be the operator cab of any of various types of equipment, such as, without limitation, industrial and agricultural equipment, such as trucks, front-end loaders, tractors, drilling machines, bulldozers, pan-scrapers, draglines, and excavators or military vehicles, such as tanks. In addition, the methods and apparatus disclosed herein can also be applied to various other types of environmental enclosures, such as rooms or buildings equipped with filtration equipment to prevent the ingress of outside contaminants (e.g., clean rooms used in semiconductor or pharmaceutical manufacturing).

The filter 16 contains filter media selected to filter the tracer gas from the air flowing through the filter 16. In a specific approach, for example, carbon dioxide that is naturally present in the ambient air surrounding the cab 12 is used as the tracer gas. Hence, in this approach, any of various chemical absorbents, such as soda lime, sodium hydroxide, calcium hydroxide or lithium hydroxide, can be used as filter media in the filter 16 for filtering carbon dioxide from the ambient air. Further details of a filter 16 for filtering carbon dioxide from air are described below in connection with FIGS. 2 and 3.

To determine whether there are any leaks in the ventilation system 10, the inducers 18 are activated to induce outside air to flow through the ventilation system 10 and into the cab 12 to establish positive pressurization inside the cab 12. A suitable gas monitor, indicated at 24, is used to monitor the concentration of the tracer gas inside the cab 12 during the test. Initially, the concentration of the tracer gas inside the cab 12 is approximately the same as the concentration of the tracer gas in the ambient air outside the cab 12. As filtered air depleted in the tracer gas flows into the cab 12, the concentration of the tracer gas inside the cab 12 decreases. The test is carried out until the concentration of the tracer gas inside the cab 12 reaches a minimum level at or above zero. Since the filter 16 in this embodiment is 100% efficient, the concentration of the tracer gas inside the cab 12 will be reduced to zero if there are no leaks in the ventilation system 10. However, the presence of leaks in the ventilation system 10 is revealed if the concentration of the tracer gas inside the cab 12 is reduced to a minimum level greater than zero.

If it is determined that there are leaks in the ventilation system 10, then further tests can be performed to identify the exact locations of such leaks. In one approach, for example, leaks are identified by flowing tracer gas from a pressurized source of such tracer gas (e.g., a gas cylinder filled with a charge of the tracer gas) over the external surface areas of the ventilation system 10 that could be contributing to the leaks while monitoring the concentration of the tracer gas inside the cab 12. Typically, such areas of the ventilation system 10 that have a tendency to cause leaks include the sealing area around the filter 16, the joints between separate portions of ductwork 14, and the openings in the ductwork 14 provided for the electrical wiring of the inducers 18. If a leak exists in a specific area of the ventilation system 10, then there will be a sudden increase in the concentration of the tracer gas measured inside the cab 12 as tracer gas is flowed over that area. Once the leaks are identified, appropriate steps can be taken to repair and/or replace the components of the ventilation system 10 causing the leaks.

Although the filter 16 is described as having an efficiency of 100%, this is not a requirement. Accordingly, filters having efficiencies less than 100% also may be used to perform a leak-test on the ventilation system 10. In one approach, for example, the concentration of the tracer gas in the ambient air outside the cab 12 is measured with the monitor 24 to determine the expected concentration of tracer gas inside the cab 12 due to losses through the filter. The cab 12 is then pressurized in the manner described above to determine the lowest achievable concentration of tracer gas inside the cab 12, which is then compared to the expected concentration of tracer gas inside the cab due to losses through the filter. The presence of leaks in the ventilation system 10 is revealed if the lowest achievable concentration of tracer gas inside the cab is greater than the expected concentration of tracer gas due to losses through the filter.

For example, if the concentration of carbon dioxide in the atmosphere surrounding the cab 12 is 400 ppm and the filter 16 is designed to remove 98% of the carbon dioxide from air flowing through the filter, the expected concentration of carbon dioxide inside the cab 12 due to losses through the filter is 8 ppm (0.02·400 ppm). Thus, for this example, the presence of leaks in the ventilation system 10 is revealed if the lowest achievable concentration of carbon dioxide inside the cab 12 is greater than 8 ppm.

Figure 2:
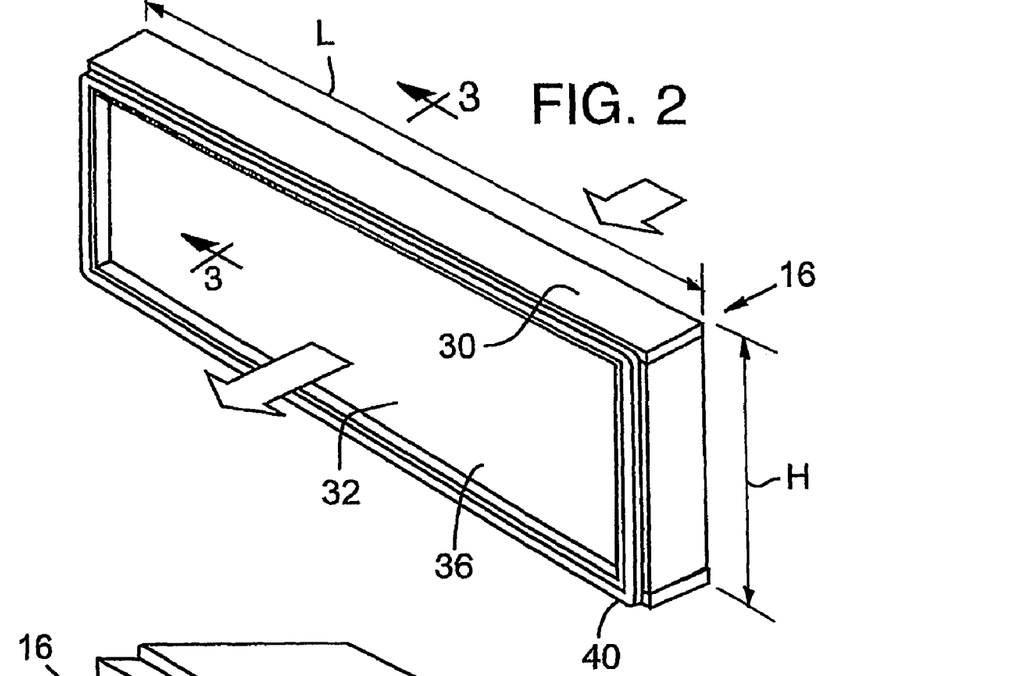
FIG. 2 is a perspective view of a filter, according to one embodiment, configured to fit in the ventilation system of an operator cab for the purpose of leak testing the ventilation system.
Figure 3:
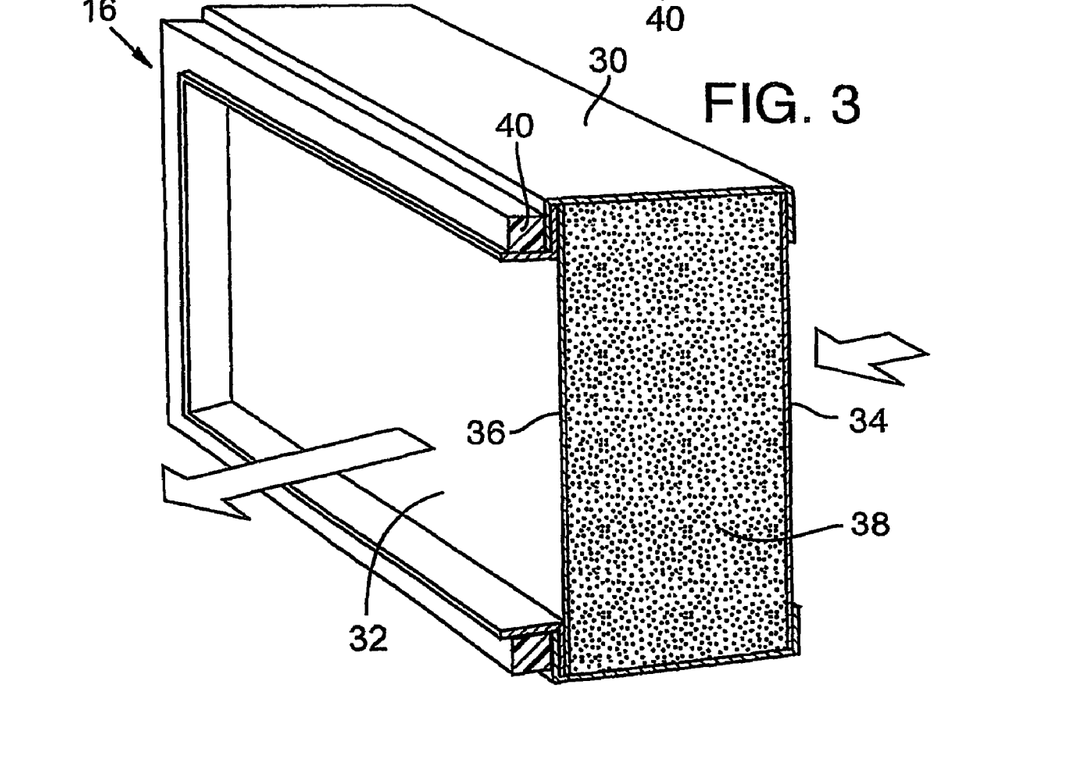
FIG. 3 is an enlarged cross-sectional view of the filter of FIG. 2 taken along line 3-3 in FIG. 2.

Referring to FIGS. 2 and 3, there is shown a test filter 16, according to one embodiment, configured to filter carbon dioxide from ambient air flowing through the filter. As shown, the filter 16 in the illustrated configuration has a generally rectangular filter housing 30, with filter media 38 contained within the housing 30. Air enters the filter 16 from the air inlet side on the back, or hidden, side of the air filter 16 as illustrated in FIG. 2. After passing through the air filter 16, filtered air depleted in carbon dioxide exists from the air outlet side 32, flowing in general in the direction of the arrows in FIGS. 2 and 3.

As best illustrated in FIG. 3, the filter 16 includes an inlet-side fibrous electrostatic filter element 34 and an outlet-side fibrous electrostatic filter element 36, although other types of filter elements also may be used. The space between the filter elements 34 and 36 is packed with filter media 38 capable of filtering carbon dioxide from the air flowing through the filter. In particular embodiments, the filter media 38 is a chemical absorbent, such as soda lime, sodium hydroxide, calcium hydroxide or lithium hydroxide, for absorbing carbon dioxide from the air flowing through the filter 16. Filter elements 34 and 36 serve to trap airborne particulate matter and retain the filter media 38 within the housing 30. A gasket 40 surrounding the periphery of the outlet side 32 serves to seal the filter 16 inside the ventilation system.

Since the sealing area around the periphery of the existing filter of the cab is a common source of leaks, the housing 30 of the test filter 16 desirably has the same overall dimensions as the existing filter of the enclosure to be tested. Also, a gasket that is identical to the existing gasket desirably is used with the test filter 16. In this manner, the integrity of the gasket design and the interface area between the existing filter and the surrounding ductwork 14 is tested in a leak-test of the ventilation system 10. Alternatively, if desired, the existing gasket of the ventilation system may be used with the test filter 16.

The construction of the filter 16 is not limited to that of the illustrated embodiment. In alternative embodiments, for example, the housing 30 of the filter 16 may be cylindrical in shape or have any of various geometric shapes. In addition, reference is made to U.S. Pat. No. 5,423,903 to Schmitz et al., which discloses an activated charcoal filter for an operator cab. The filter in the '903 patent can be adapted to filter carbon dioxide from an air stream by replacing the activated charcoal with soda lime or other suitable absorbent materials.

If a component of air other than carbon dioxide is used as the tracer gas to leak-test the ventilation system 10, then the filter media 38 is selected for filtering that component from the stream of air passing through the filter. For example, if oxygen or nitrogen is used as the tracer gas, the filter media 38 may comprise a molecular sieve selected to adsorb either oxygen or nitrogen from the air stream passing through the filter.

Figure 4:
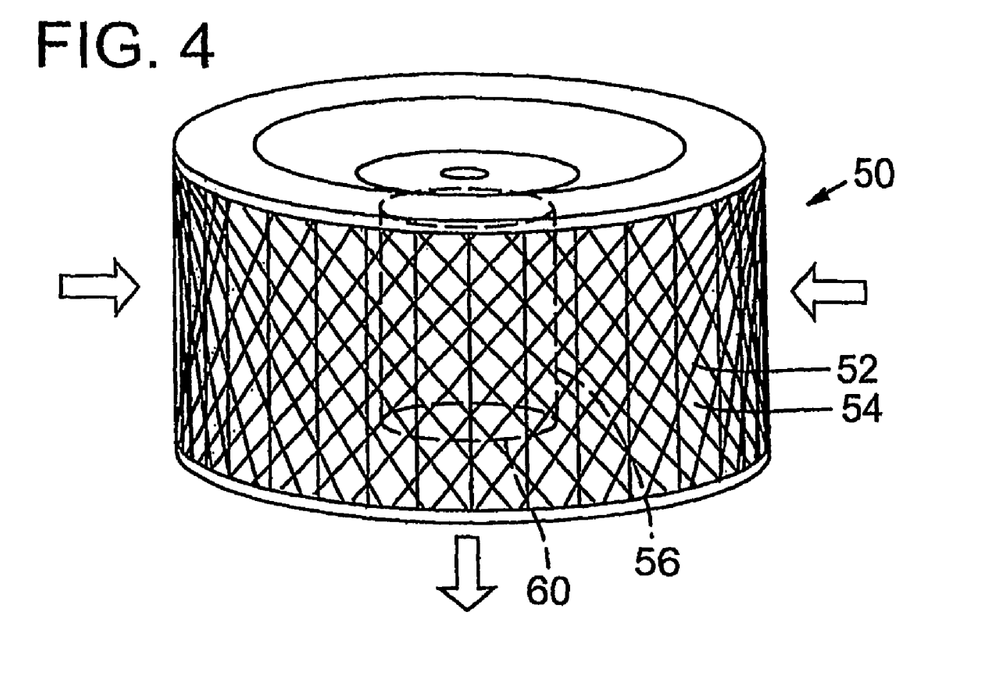
FIG. 4 is a perspective view of a filter, according to another embodiment, configured to fit in the ventilation system of an operator cab for the purpose of leak testing the ventilation system.
Figure 5:
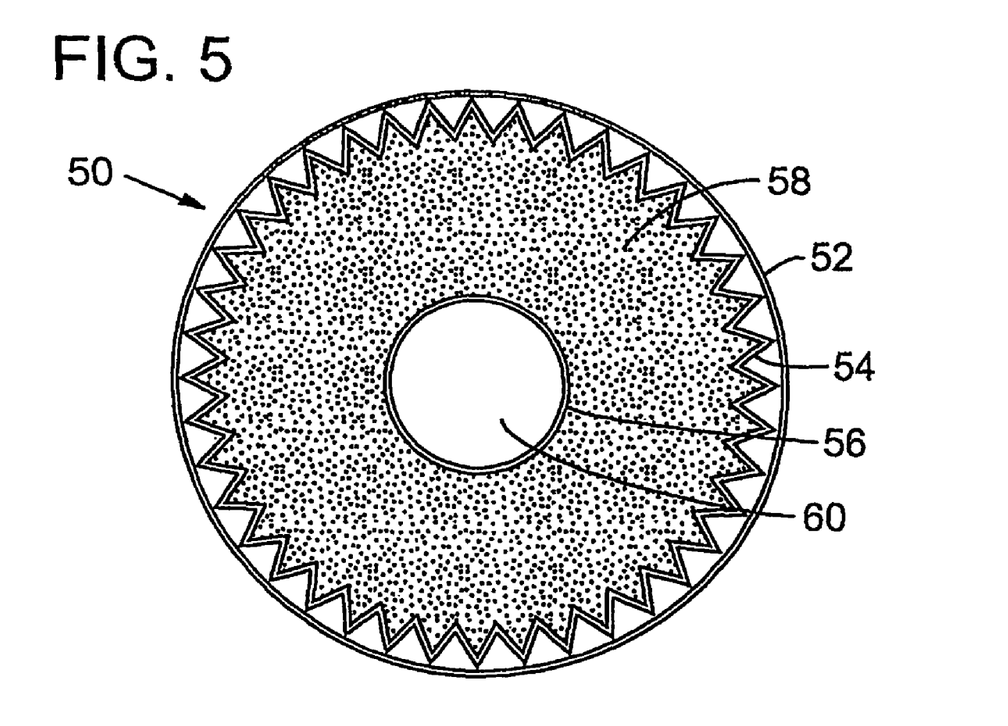
FIG. 5 is a cross-sectional view of the filter of FIG. 4, taken along a plane perpendicular to the longitudinal axis of the filter.

Referring to FIGS. 4 and 5, a carbon dioxide filter according to another embodiment is indicated generally at 50. The filter 50 in the illustrated configuration is generally cylindrical in shape and has an outer metal screen 52, an outer or inlet side filter element 54, an inner or outlet side filter element 56, and filter media 58 (e.g., soda lime) interposed between the filter elements 54 and 56. Filter element 54 in the illustrated form is a pleaded style filter element, although this is not required. Air enters the filter 50 through the screen 52, flows through filter element 54, filter media 58, filter element 56, and exits the filter through an outlet 60, in the direction of the arrows in FIG. 4.

The relationship between airflow into an enclosure, such as the illustrated cab 12, and the concentration of the tracer gas inside the enclosure over a test period can be described by the vapor/gas decay equation $$Vdx = Q_g dt - Qxdt, \qquad (1)$$

where V is the volume of the enclosure, x is the concentration of the tracer gas inside the enclosure, $Q_g$ is the volumetric inflow rate of tracer gas into the enclosure, Q is the total volumetric flow rate of air through the ventilation system (including filtered and leaked gas), and t is time. Hartman, H. L., MINE VENTILATION AND AIR CONDITIONING, 1961, p. 398.

Rearranging equation 1 for integration yields:

$$\int_{x_o}^{x} \frac{dx}{Q_g - Q_x} = \frac{1}{V} \int_{t_0}^{t} dt. \qquad (2)$$

Solving equation 2 yields:

$$\ln \frac{Q_g - Qx}{Q_g - Qx_o} = -\frac{Q\Delta t}{V}. \qquad (3)$$

Substituting Qlc for gas leakage $Q_g$ into the cab, where l is the percent leakage of outside air around and/or through the ventilation system, and c is the concentration of the tracer gas outside the enclosure (in percent by volume), equation 3 becomes $$\ln \frac{Qlc - Qx}{Qlc - Qx_o} = -\frac{Q\Delta t}{V}. \qquad (4)$$

Simplifying equation 4 yields:

$$\ln \frac{lc - x}{lc - x_o} = -\frac{Q\Delta t}{V}. \qquad (5)$$

Solving equation 5 for $\Delta t$ produces the equation $$\Delta t = -\left( \ln \frac{lc - x}{lc - x_o} \right) \cdot \frac{V}{Q}. \qquad (6)$$

Hence, the change in time $\Delta t$ for a test period is a function of the initial and final concentration of the tracer gas $x_o$ and x, respectively, inside the enclosure, the volume V of the enclosure, the total ventilation system air quantity Q, the percentage of air leaked through the ventilation system l, and the concentration of tracer gas c outside the enclosure. As described below, equation 6 provides the basis for a timed performance test for determining whether the leakage of the cab 12 meets or exceeds a specified minimum allowable leakage.

In one embodiment of such a test, for example, a gas monitor is used to measure the concentration of tracer gas c outside the cab 12 and the initial concentration of tracer gas $x_o$ inside the cab 12. For a specified leakage l, and assuming a filter efficiency of 100%, the final or minimum concentration of tracer gas x inside the cab 12 is the product of the leakage l and the concentration of tracer gas c outside the cab 12 (i.e., l·c). If the filter efficiency is less than 100%, the product l·c is added to the expected leakage through the filter 16 (i.e., the penetration of tracer gas through the filter 16) to determine the final or minimum concentration of tracer gas x inside the cab 12. The value for the volume V in equation 6 can be measured or obtained from the manufacturer of the cab 12. The value for Q can be measured using a conventional air flow meter or by measuring the differential pressure across the filter and translating the differential pressure into the air quantity Q, as further described below. Substituting these values into equation 6, the time $\Delta t$ required for the concentration of tracer gas inside the cab 12 to reduce to the minimum level x for the specified leakage l is calculated. The change in time $\Delta t$ provides a reference value for determining whether the actual leakage of the cab 12 is equal to or less than the specified minimum leakage for the cab 12.

After calculating the time $\Delta t$, the cab 12 is tested to measure the actual time required for the concentration of tracer gas inside the cab 12 to reach the minimum level x. If the measured change in time is less than the change in time determined mathematically, then the actual leakage of the cab 12 is less than the specified leakage l. On the other hand, if the measured change is greater than the change in time determined mathematically, then the actual leakage of the cab 12 is greater than the specified leakage l. If it is determined that the actual leakage is not acceptable, the ventilation system 10 can be further tested to identify the portions of the ventilation system 10 causing the leaks, as described above, so that those portions can be repaired and/or replaced as necessary.

In some cases, the filtered air quantity Q for a particular enclosure may not be easily determined with a conventional air flow meter. Instead of using an air flow meter to determine the value of Q for any enclosure, a $\Delta p$ (differential pressure) v. Q flowchart can be generated for a particular filter 16 for relating $\Delta p$ to Q for that filter. Thus, the amount of filtered air flowing into an enclosure can be determined by measuring the differential pressure across the filter 16 and translating the differential pressure measurement into a filtered air quantity measurement using the flowchart.

The methods and systems described herein can be used to test the integrity of a seal or gasket of a filter used in a ventilation system. In one embodiment, for example, a test filter capable of filtering a tracer gas is installed in the ventilation system of a test stand, and a leak test is performed by flowing outside air through the ventilation system and into the enclosure of the test stand. Since the ventilation system, other than the seal of the filter, is essentially leak-free, the presence of tracer gas inside the enclosure indicates the gasket is not sufficiently sealing the filter. Thus, in this embodiment, a leak test performed on the ventilation system tests the ability of the gasket to provide a fluid-tight seal for the filter.

EXAMPLES

Example 1

This example illustrates the application of a timed performance test for determining whether the leakage of a cab meets or exceeds a specified minimum allowable leakage. An enclosure having a volume (V) of 52.5 ft$^3$ and a ventilation system operable to produce an airflow rate (Q) of 25 cfm is tested using carbon dioxide as the tracer gas. The carbon dioxide concentration (c) measured outside the enclosure is 425 ppm, and the initial carbon dioxide concentration ($x_o$) measured inside the enclosure is 394 ppm. Assuming a filter efficiency of 100%, the final carbon dioxide concentration (x) inside the enclosure at a leakage (l) of 2% will be 8.5 ppm.

Equation 6 is based on the natural logarithm of the concentration ratio $(lc-x)/(lc-x_o)$, which ranges from negative to positive infinity. Thus, if the exact limit of the final inside cab concentration (x) is used in equation 6, the natural logarithm of the concentration ratio goes off to negative infinity and the time (t) goes off to infinity. Accordingly, for a viable application of equation 6, the final concentration (x) is rounded up, such as to the nearest tenth or whole number. In the present example, the final carbon dioxide concentration (x), which is 8.5 ppm, is rounded up to the nearest whole number, which is 9 ppm.

Applying equation 6, the concentration of carbon dioxide enclosure inside the enclosure should reduce to 9 ppm in 14 minutes for a 2% leakage. During testing, the concentration of carbon dioxide inside the enclosure reduced to 9 ppm in less than 14 minutes, indicating that the actual leakage of the ventilation system is less than 2%. The ventilation system in this example therefore would provide at least a 50:1 protection factor for the occupant of the enclosure. On the other hand, had the time for the concentration of carbon dioxide to reduce to 9 ppm exceeded 14 minutes, or if the concentration of carbon dioxide could not be reduced to 9 ppm, then the actual leakage would be more than 2%.

Example 2

This example demonstrates the performance of one embodiment of a carbon dioxide filter having a rectangular housing, such as shown in FIGS. 2 and 3. The filter includes about 6 lbs. of soda lime Puritan Bennett Corp., Pleasanton, Calif.) retained between two electrostatic filter elements. The soda lime comprises about 70% calcium hydroxide (although other formulations also may be used). The housing has a length L (FIG. 2) measured between the side walls of the housing of about 16 inches and a height H (FIG. 2) measured between the top and bottom walls of the housing of about 6 inches. The bed of soda lime in the filter has a depth, or thickness, measured in the direction of flow of about 2.19 inches.

Table 1 below illustrates the performance of the filter for airflows of about 15.7 cfm and 24.8 cfm into a simulated cab test stand having an interior cab volume of about 52.3 ft$^3$. As shown in Table 1, the filter was 100% efficient at 15.7 cfm and 24.8 cfm, and achieved 0 ppm of carbon dioxide inside the cab within 16 minutes at 15.7 cfm and within 4.3 minutes at 24.8 cfm.

TABLE 1

| Time (min) | Cab Airflow 15.7 cfm Inside Conc. (ppm) | Cab Airflow 24.8 cfm Inside Conc. (ppm) |
| --- | --- | --- |
| 0.0 | 389 | 35 |
| 1.0 | 402 | 11 |
| 2.0 | 369 | 15 |
| 3.0 | 305 | 16 |
| 4.0 | 242 | 16 |
| 5.0 | 224 | 0 |
| 6.0 | 183 | |
| 7.0 | 121 | |
| 8.0 | 75 | |
| 9.0 | 66 | |
| 10.0 | 52 | |
| 11.0 | 28 | |
| 12.0 | 20 | |
| 13.0 | 8 | |
| 14.0 | 8 | |
| 15.0 | 12 | |
| 15.5 | 3 | |
| 16.0 | 0 | |

Example 3

This example demonstrates the performance of a carbon dioxide filter having a cylindrical housing, such as shown in FIGS. 4 and 5. The filter in this example has an outer diameter of about 10.75 inches and a length of about 7 inches, and contains about 10.3 lbs. of soda lime Puritan Bennett Corp.) retained between two electrostatic filter elements. Table 2 below shows the performance of this filter for an airflow of about 24.8-25 cfm into the 52.3 ft$^3$ cab test stand. As shown in Table 2, the filter was 100% efficient and achieved 0 ppm of carbon dioxide inside the cab within 15 minutes of operation.

TABLE 2

| (Cab Airflow = 24.8-25.0 cfm) | | |
|---|---|---|
| Time (min) | Inside Conc. (ppm) | Outside Conc. (ppm) |
| 0.0 | 610 | 558 |
| 1.0 | 582 | 564 |
| 2.0 | 502 | 568 |
| 3.0 | 352 | 576 |
| 4.0 | 228 | 580 |
| 5.0 | 156 | 586 |
| 6.0 | 120 | 593 |
| 7.0 | 57 | 601 |
| 8.0 | 38 | 610 |
| 9.0 | 37 | 606 |
| 10.0 | 41 | 602 |
| 11.0 | 36 | 593 |
| 12.0 | 31 | 592 |
| 13.0 | 27 | 593 |
| 14.0 | 16 | 594 |
| 15.0 | 0 | 589 |

Example 4

Another example of a filter has a generally rectangular housing, such as shown in FIGS. 2 and 3, that measures about 16 inches in length and about 6 inches in height. The filter is filled with about 5.64 lbs. of Drägersorb® 400 soda lime (Draeger Safety, Inc. of Pittsburgh, Pa.). The bed of soda lime has a depth measured in the direction of flow of about 2.19 inches. Table 3a below illustrates the performance of the filter when used to filter the air flowing into the 52.3 ft$^3$ cab test stand at a flow rate of about 24.9 cfm. As shown in Table 3a, the filter was 100% efficient at 24.9 cfm and achieved 0 ppm of carbon dioxide inside the cab within 12 minutes.

The same filter was then used to filter air flowing into the test stand at a flow rate of about 40 cfm. The flow rate was reduced to about 35 cfm after about 15 minutes of operation and then to about 25.4 cfm after about 23 minutes of operation. The performance of the filter is summarized in Table 3b, which shows that the filter was about 95% efficient at 40 cfm and 100% efficient when the air flow was reduced to 25.4 cfm.

TABLE 3a

| (Cab airflow = 24.9 cfm) | | |
|---|---|---|
| Time (min) | Inside Conc. (ppm) | Outside Conc. (ppm) |
| 0.0 | 612 | 590 |
| 1.0 | 568 | 594 |
| 2.0 | 407 | 579 |
| 3.0 | 267 | 614 |
| 4.0 | 200 | 628 |
| 5.0 | 153 | 629 |
| 6.0 | 110 | 627 |
| 7.0 | 77 | 631 |
| 8.0 | 45 | 631 |
| 9.0 | 24 | 630 |
| 10.0 | 5 | 631 |
| 11.0 | 1 | 628 |
| 12.0 | 0 | 642 |
| 13.0 | 0 | 632 |
| 14.0 | 0 | 631 |
| 15.0 | 0 | 628 |

TABLE 3b

| (Cab airflow = 40 cfm at $0 \leq t \leq 15$; 35 cfm at $16 \leq t \leq 20$; and 25.4 cfm at $23 \leq t \leq 44$) | | |
|---|---|---|
| Time (min) | Inside Conc. (ppm) | Outside Conc. (ppm) |
| 0.0 | 624 | 608 |
| 1.0 | 570 | 577 |
| 2.0 | 333 | 597 |
| 3.0 | 184 | 547 |
| 4.0 | 124 | 571 |
| 5.0 | 85 | 565 |
| 6.0 | 66 | 563 |
| 7.0 | 46 | 550 |
| 8.0 | 40 | 542 |
| 9.0 | 32 | 546 |
| 10.0 | 28 | 506 |
| 11.0 | 21 | 511 |
| 12.0 | 21 | 544 |
| 13.0 | 19 | 511 |
| 14.0 | 17 | 521 |
| 15.0 | 24 | 516 |
| 16.0 | 26 | 525 |
| 17.0 | 25 | 520 |
| 18.0 | 22 | 513 |
| 19.0 | 18 | 538 |
| 20.0 | 19 | 514 |
| 23.0 | 13 | 533 |
| 25.0 | 8 | 542 |
| 26.0 | 2 | 523 |
| 27.0 | 3 | 524 |
| 28.0 | 6 | 555 |
| 29.0 | 1 | 526 |
| 30.0 | 2 | 573 |
| 32.0 | 0 | 542 |
| 35.0 | 0 | 519 |
| 37.8 | 0 | 516 |
| 39.0 | 0 | 499 |
| 40.0 | 3 | 531 |
| 44 | 0 | 505 |

Example 5

This example demonstrates the performance of a carbon dioxide filter comprising a John Deere model JD60R filter housing (John Deere Co., Moline, Ill.) packed with about 7.86 lbs. of Dragersorb® 400 soda lime. The filter was initially used to filter the air flow into a John Deere model 7800 tractor cab. Table 4 below shows the carbon dioxide concentration inside and outside the cab while the cab fan was operated at its highest speed level (which is the fourth speed level of the fan) and the second highest speed level (which is the third speed level of the fan). The speed of the fan was reduced from the fourth speed level to the third speed level after 20 minutes of operation. The filter achieved 0 ppm of carbon dioxide inside the cab after about 9 minutes at the third speed level of the fan.

TABLE 4

| Time (min) | Inside Conc. (ppm) | Outside Conc. (ppm) |
| --- | --- | --- |
| 0.0 | 461 | 334 |
| 1.0 | 384 | 363 |
| 2.0 | 306 | 373 |
| 3.0 | 209 | 353 |
| 4.0 | 159 | 335 |
| 5.0 | 106 | 360 |
| 6.0 | 71 | 340 |
| 7.0 | 63 | 340 |
| 8.0 | 45 | 346 |
| 9.0 | 36 | 344 |
| 10.0 | 38 | 347 |
| 11.0 | 36 | 321 |
| 12.0 | 23 | 344 |
| 13.0 | 13 | 340 |
| 14.0 | 12 | 339 |
| 15.0 | 6 | 329 |
| 16.0 | 6 | 326 |
| 17.0 | 6 | 334 |
| 18.0 | 7 | 335 |
| 19.0 | 11 | 324 |
| 20.0 | 15 | 329 |
| 21.0 | 45 | 333 |
| 22.0 | 69 | 331 |
| 23.0 | 77 | 337 |
| 24.0 | 59 | 339 |
| 25.0 | 50 | 334 |
| 26.0 | 36 | 311 |
| 27.0 | 21 | 320 |
| 28.0 | 16 | 324 |
| 29.0 | 7 | 330 |
| 29.1 | 0 | 338 |

The filter was then used to filter the air flow into the 52.3 ft$^3$ cab test stand. Table 5 below shows the carbon dioxide concentration inside and outside of the cab at a flow rate of 47.7 cfm. As shown the filter was 100% efficient at 47.7 cfm and achieved 0 ppm of carbon dioxide inside the cab in about 7 minutes.

TABLE 5

| (Cab airflow = 47.7 cfm) | | |
| --- | --- | --- |
| Time (min) | Inside Conc. (ppm) | Outside Conc. (ppm) |
| 0.0 | 484 | 321 |
| 1.0 | 354 | 337 |
| 2.0 | 209 | 339 |
| 3.0 | 106 | 343 |
| 4.0 | 63 | 332 |
| 5.0 | 18 | 329 |
| 6.0 | 12 | 321 |
| 7.0 | 0 | 308 |
| 8.0 | 0 | 309 |
| 9.0 | 0 | 318 |
| 10.0 | 0 | 308 |

The present invention has been shown in the described embodiments for illustrative purposes only. The present invention may be subject to many modifications and changes without departing from the spirit or essential characteristics thereof. We therefore claim as our invention all such modifications as come within the spirit and scope of the following claims.

We claim:

1. A method for leak testing the ventilation system of an environmental enclosure, the method comprising:
    inducing air surrounding the enclosure to flow through the ventilation system and a gas filter positioned in the ventilation system into the enclosure to establish positive pressure in the enclosure;
    filtering a tracer gas from the air flowing through the gas filter, the tracer gas comprising a gas naturally present in the air surrounding the enclosure;
    determining the expected predetermined concentration of tracer gas inside the enclosure based upon the efficiency of the filter;
    measuring the lowest achievable concentration of tracer gas inside the enclosure; and
    detecting for the presence of leaks in the ventilation system by comparing the lowest achievable concentration of tracer gas inside the enclosure to the expected predetermined concentration of tracer gas inside the enclosure based upon the efficiency of the filter, wherein the presence of leaks in the ventilation system is indicated if the lowest achievable concentration of tracer gas exceeds the expected predetermined concentration of tracer gas.

2. The method of claim 1, wherein the filter is capable of filtering all of the tracer gas flowing through the filter.

3. The method of claim 1, wherein:
    the tracer gas comprises carbon dioxide; and
    the filter is capable of filtering all of the carbon dioxide from the air flowing through the filter.

4. The method of claim 1, wherein the enclosure comprises an operator cab.

5. The method of claim 1, wherein the tracer gas comprises nitrogen.

6. The method of claim 1, wherein the tracer gas comprises oxygen.

7. The method of claim 1, wherein the tracer gas comprises argon.

8. The method of claim 1, wherein the tracer gas comprises carbon dioxide.

9. The method of claim 8, wherein the filter comprises a filter housing and soda lime contained in the housing for absorbing carbon dioxide from the air flowing through the filter.

10. A method for leak testing the ventilation system of an environmental enclosure, the method comprising:
    inducing air surrounding the enclosure to flow through the ventilation system and a gas filter positioned in the ventilation system into the enclosure to establish positive pressure in the enclosure so as to replace air exiting the enclosure;
    filtering a tracer gas from the air flowing through the gas filter, the tracer gas comprising a gas naturally present in the air surrounding the enclosure;
    calculating the predetermined time required for the concentration of the tracer gas inside the enclosure to reduce to a predetermined level at a predetermined leakage based upon the efficiency of the filter; and
    measuring the time required for the concentration of the tracer gas inside the enclosure to reduce to the predetermined level to determine if the measured time is greater than the calculated predetermined time, which is an indication that a leak exists in the system.

11. A method for leak testing a ventilation system, the method comprising:
    inducing air outside of an enclosure to flow through the ventilation system and a gas filter positioned in the ventilation system into the enclosure so as to establish positive pressure inside the enclosure, wherein the filter filters a tracer gas from the air flowing through the filter, the tracer gas comprising a gas naturally present in the air surrounding the enclosure;

measuring the concentration of tracer gas inside the enclosure; and detecting for the presence of leaks in the ventilation system from the concentration of the tracer gas inside the enclosure;

wherein detecting for the presence of leaks in the ventilation system comprises determining the expected predetermined concentration of tracer gas inside the enclosure based upon the efficiency of the filter; and comparing the measured concentration of tracer gas inside the enclosure to the expected predetermined concentration of tracer gas inside the enclosure based upon the efficiency of the filter to determine whether there are any leaks in the ventilation system, wherein the presence of leaks in the ventilation system is indicated if the measured concentration of tracer gas exceeds the expected predetermined concentration of tracer gas.

12. The method of claim 11, wherein the filter is capable of filtering all of the tracer gas flowing through the filter.

13. The method of claim 11, wherein:
the tracer gas comprises carbon dioxide; and
the filter is capable of filtering all of the carbon dioxide from the air flowing through the filter.

14. The method of claim 11, wherein the tracer gas comprises carbon dioxide.

15. The method of claim 14, wherein the filter comprises soda lime for filtering carbon dioxide from the air flowing through the filter.

* * * * *